United States Patent
Irwin (10) Patent No.: US 9,651,755 B2
(45) Date of Patent: May 16, 2017

(54) FIBER OPTIC INTERCONNECT SYSTEMS AND METHODS

(71) Applicant: Panduit Corp., Tinley Park, IL (US)

(72) Inventor: Phillip J. Irwin, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 133 days.

(21) Appl. No.: 14/858,008

(22) Filed: Sep. 18, 2015

(65) Prior Publication Data

US 2016/0091687 A1 Mar. 31, 2016

Related U.S. Application Data (60) Provisional application No. 62/057,357, filed on Sep. 30, 2014.

(51) Int. Cl.
G02B 6/00 (2006.01)
G02B 6/44 (2006.01)
H04B 10/00 (2013.01)

(52) U.S. Cl.
CPC ......... *G02B 6/4472* (2013.01); *G02B 6/4452* (2013.01); *H04B 10/12* (2013.01)

(58) Field of Classification Search
CPC ..... G02B 6/4472; G02B 6/4452; H04B 10/12
USPC ....................................... 385/135
See application file for complete search history.

(56) References Cited

U.S. PATENT DOCUMENTS

| | | | |
|---|---|---|---|
| 5,214,730 A | 5/1993 | Nagasawa et al. | |
| 5,828,805 A | 10/1998 | Morlion et al. | |
| 6,123,463 A | 9/2000 | Kashihara et al. | |
| 6,609,835 B2 | 8/2003 | Trezza et al. | |
| 6,758,600 B2 | 7/2004 | Del Grosso et al. | |
| 7,147,383 B2 | 12/2006 | Sullivan | |
| 7,240,233 B2 | 7/2007 | Gredone et al. | |
| 7,756,371 B1 | 7/2010 | Burnham et al. | |
| 8,251,591 B2 | 8/2012 | Barnes et al. | |
| 8,485,737 B2 | 7/2013 | Kolesar | |
| 2005/0207709 A1* | 9/2005 | Del Grosso | G02B 6/4472 385/71 |
| 2010/0098428 A1 | 4/2010 | Barnes et al. | |
| 2012/0093518 A1 | 4/2012 | Tosetti et al. | |

FOREIGN PATENT DOCUMENTS

| | | |
|---|---|---|
| EP | 1039323 A1 | 9/2000 |
| JP | 9-68629 A | 3/1997 |
| JP | 2002-228898 A | 8/2002 |

(Continued)

OTHER PUBLICATIONS

100G Ready, Corning LANscape Pretium Solutions, Aug. 1, 2015.

(Continued)

*Primary Examiner* — Jerry Blevins (74) *Attorney, Agent, or Firm* — Christopher S. Clancy; James H. Williams; Yuri Astvatsaturov (57) ABSTRACT

Embodiments of the present invention relate to the field of fiber optic connectivity, and more specifically, to systems and methods for connecting fiber optic transceivers. In an embodiment, the present invention provides a system which enables the interconnection of fiber optic transceivers such as, for example, 24-fiber transceivers like the 100GBASE-SR10 transceivers while maintaining appropriate fiber polarity.

22 Claims, 7 Drawing Sheets

(56) References Cited

FOREIGN PATENT DOCUMENTS

| JP | 2003-329887 A | 11/2003 |
|---|---|---|
| JP | 2007-148089 A | 6/2007 |
| WO | WO2010147762 A1 | 12/2010 |
| WO | WO2011053409 A1 | 5/2011 |

OTHER PUBLICATIONS

Maintaining OIF-VSR4-03.0 System Polarity with MTP Connectors, AEN 76, Revision 2, Corning Cable Systems, revised Nov. 23, 2004.
Parallel Optics, AEN 123, Rev 0, Corning Cable Systems, Mar. 23, 2008.
Data Center Design, Design Considerations for 40G and 100G Ethernet Networks, Ray Barnes, www.cablingbusiness.com/wordpress, Oct. 2009.
Corning Cable Systems, Standard Recommended Procedure (SRP) 003-121, Issue 1, Apr. 2008.
Skew Testing for Parallel Optics Systems, David J. Hessong et al., Corning Cable Systems, International Wire & Cable Symposium, Proceedings of the 57th IWCS, Aug. 1, 2015.
100G: Opportunities and challenges, and enabling technologies, Yongpeng Zhao, Luster lightTech Corp., Oct. 2008.
Keys to Successfully Implementing Fiber in the Datacenter, OFS Fluke Networks, BiCSi Luncheon, Winter 2009.
Data Center Fabric, Corning Cabling Systems Optical Cabling Solutions for Brocade, Brocade Communications Systems, Inc., Sep. 2008.
Building an Agile Data Center Optical Infrastructure, TE Connectivity, 2012.
MTP Connector Comparison to MPO connector, MTP Overview, USConec, Jan. 14, 2003.
Corning Cable Systems Optical Cabling Solutions for Brocade, Corning LANscape Pretium Solutions, Mar. 2009.
Data Center Cabling Technology and Trends, Berk-Tek, Lisa A. Huff, May 2, 2008.
Development of Mini-MPO Connector, Optical Cable Systems Dept., Opto-Technology Lab., R&D Div., Shimoji, et al., Furukawa Review, Nov. 18, 1999.
IEEE 802.3 architecture and 40/100GbE, Ilango Ganga, Intel, John D'Ambrosia, Force10 Networks, Nov. 13, 2007.
10 GbE, 40 GbE and 100 GbE, The Cabling Partnership, 2008.
Keeping up to Speed with High Data Rate Fiber Solutions, Eric Leichter, CommScope, Bicsi, Aug. 1, 2015.
How to Make Multimode 100 GigE Succeed, McData, Scott Kipp, Jan. 10, 2007.
High Speed Ethernet Link Loss, Brocade, Kipp et al., Jan. 11, 2008.
Data Center Fiber Cabling Topologies and Lengths, Systimax Solutions, Paul Kolesar, IEEE 802.3 HSSG, Sep. 2006.
Clause 86 MDI Optical Pin Layout and Connector, Paul Kolesar et al., IEEE P802.3ba, Jan. 2009.
100GBASE-F and 100GBASE-T—Fact or Fiction, FIA 2007 Commercial Awareness Seminars, Mar. 2007.
Standardizing 40Gb Ethernet, Shimon Muller, Sun Microsystems, Inc., Apr. 2007.
Stecksystem MTP=MPO, fur Infiniband (Parallel Optics), Rosenberger OSI Fiber-Optics, May 2007.
Preparing Your Data Center Infrastructure for 40G and Beyond, Brian Rhoney, Corning Cable Systems, Bicsi, Aug. 1, 2015.
Silicon Photonics Summary, Cisco, Aug. 1, 2015.
U-Space System for Brocade 48000, Corning LANscape Pretium Solutions, Apr. 2008.
"New" High Density PARA-OPTIX Cable Assemblies, Tyco Electronics, revised Nov. 2003.
"New" High Density PARA-OPTIX Transceivers, Tyco Electronics, revised Nov. 2003.
WDM Alternatives for 100Gb SMF Applications, IEEE HSSG Presentation, Sep. 21, 2006, Chris Cole.

\* cited by examiner

Table 1

| Cable Assembly Wiring-Method A | | |
|---|---|---|
| 24F MPO Position | 12F MPO Conn # | 12F MPO Position |
| 1 | 1 | 1 |
| 2 | | 2 |
| 3 | | 3 |
| 4 | | 4 |
| 5 | | 5 |
| 6 | | 6 |
| 7 | | 7 |
| 8 | | 8 |
| 9 | | 9 |
| 10 | | 10 |
| 11 | | 11 |
| 12 | | 12 |
| 13 | 2 | 1 |
| 14 | | 2 |
| 15 | | 3 |
| 16 | | 4 |
| 17 | | 5 |
| 18 | | 6 |
| 19 | | 7 |
| 20 | | 8 |
| 21 | | 9 |
| 22 | | 10 |
| 23 | | 11 |
| 24 | | 12 |

FIG.4

Table 2

| Transceiver 1 Position | Transceiver 2 Position |
|---|---|
| Tx0 | Rx0 |
| Tx1 | Rx1 |
| Tx2 | Rx2 |
| Tx3 | Rx3 |
| Tx4 | Rx4 |
| Tx5 | Rx5 |
| Tx6 | Rx6 |
| Tx7 | Rx7 |
| Tx8 | Rx8 |
| Tx9 | Rx9 |
| Tx10 | Rx10 |
| Tx11 | Rx11 |
| Rx0 | Tx0 |
| Rx1 | Tx1 |
| Rx2 | Tx2 |
| Rx3 | Tx3 |
| Rx4 | Tx4 |
| Rx5 | Tx5 |
| Rx6 | Tx6 |
| Rx7 | Tx7 |
| Rx8 | Tx8 |
| Rx9 | Tx9 |
| Rx10 | Tx10 |
| Rx11 | Tx11 |

FIG.5

FIBER OPTIC INTERCONNECT SYSTEMS AND METHODS

CROSS-REFERENCE TO RELATED APPLICATIONS

This application claims the benefit of U.S. Provisional Patent Application No. 62/057,357 filed on Sep. 30, 2014, which is incorporated herein by reference in its entirety.

FIELD OF INVENTION

Embodiments of the present invention relate to the field of fiber optic connectivity, and more specifically, to systems and methods for connecting fiber optic transceivers.

BACKGROUND

Fiber optic communication generally takes place over a network where optical signals travel within an optical waveguide (e.g., an optical fiber) between an optical transmitter (e.g., LEDs or VCSELs [vertical-cavity surface-emitting lasers]) and an optical receiver (e.g., optoelectronic sensors). To achieve proper operation, it is especially important to ensure that an optical fiber that is coupled to a transmitter at one end is also coupled to a receiver on another end. This configuration is critical because each fiber channel needs to have a means for generating a signal and a means for sensing a signal.

A variety of different transceivers are in existence today. The arrangement of the transmit lanes (Tx) and receive lanes (Rx) of those transceivers are typically governed by various standards. For example, IEEE 802.3ba, which is incorporated herein by reference in its entirety, provides the basis for the positioning of Tx and Rx lanes in a 100GBASE-SR10 transceiver. Per IEEE 802.3ba, a 100GBASE-SR10 transceiver employs two rows of 12 fibers each, with 10 of the 12 top center lanes acting as the Rx lanes and 10 of the 12 bottom center lanes acting as the Tx lanes. The top/bottom orientation is determined with reference to a receptacle key being positioned on top when looking into the receptacle. Although there are no particular lane assignments among the Tx or Rx lanes, and thus no corresponding Tx/Rx pairs, it is still imperative that a fiber coupled to a Tx lane on one transceiver be routed to an Rx lane on another transceiver.

While theoretically a pair of 100GBASE-SR10 transceivers may be interconnected via a 24-fiber trunk cable, practical implementation of such a network may pose a number of problems which are linked to the existing fiber optic infrastructure. Many environments where fiber optic connectivity is in use today, such as for example data centers, employ 12-fiber backbone/trunk cables/links. These cables are often hidden from view and are not easily accessible. As a result, upgrading the existing backbone infrastructure can become costly and disruptive.

Options for routing signals of a 24-fiber transceiver through multiple trunk cables have been discussed in various standards, including TIA-568-C.0-2 which is incorporated herein by reference in its entirety. However, these implementations still have certain shortcomings. For example, the Method A described in TIA-568-C.0-2 relies on using two different harnesses. While Method B described in TIA-568-C.0-2 eliminates the need for different harnesses, it requires a key-up to key-up mating scheme between the harnesses and the trunk cables. In both cases, these drawbacks can create installation problems and/or obstacles.

As a result, there is a continued need for improved systems and methods which enable the interconnection of fiber optic transceivers, and in particular, 24-fiber transceivers such as the 100GBASE-SR10 transceivers.

SUMMARY

Accordingly, at least some embodiments of the present invention provide systems and methods which enable the interconnection of fiber optic transceivers such as, for example, 24-fiber transceivers like the 100GBASE-SR10 transceivers.

In an embodiment, the present invention is a communication link for use in a fiber optic communication network. The communication link includes a first breakout harness and a second breakout harness, where each of the first breakout harness and the second breakout harness includes: an equipment-side connector including a key, and a first and a second row of optical fiber channels positioned relative to the equipment-side connector key; a first trunk-side connector including a key and a row of optical fiber channels positioned relative to the first trunk-side connector key; a second trunk-side connector including a key and a row of optical fiber channels positioned relative to the second trunk-side connector key; a first plurality of optical fibers connecting the first row of optical fiber channels of the equipment-side connector to the row of optical fiber channels of the first trunk-side connector such that a left-to-right order of each of the first plurality of optical fibers is the same in both of the equipment-side connector and the first trunk-side connector when determined relative to respective the keys; and a second plurality of optical fibers connecting the second row of optical fiber channels of the equipment-side connector to the row of optical fiber channels of the second trunk-side connector such that a left-to-right order of each of the second plurality of optical fibers is the same in both of the equipment-side connector and the first trunk-side connector when determined relative to respective the keys. The communication link also includes a first trunk cable and a second trunk cable, where each of the first trunk cable and the second trunk cable includes: a first trunk-cable connector including a key and a row of optical fiber channels positioned relative to the first trunk-cable connector key; a second trunk-cable connector including a key and a row of optical fiber channels positioned relative to the second trunk-cable connector key; and a third plurality of optical fibers connecting the row of optical fiber channels of the first trunk-cable connector to the row of optical fiber channels of the second trunk-cable connector such that a left-to-right order of each of the third plurality of optical fibers is the same in both of the first trunk-cable connector and the second trunk-cable connector when determined relative to respective the keys. The first trunk-side connector of the first breakout harness is connected to the second trunk-side connector of the second breakout harness at least partially via the first trunk cable, and the second trunk-side connector of the first breakout harness is connected to the first trunk-side connector of the second breakout harness at least partially via the second trunk-cable.

In another embodiment, the present invention is a communication link for use in a fiber optic communication network. The communication link includes a first breakout harness and a second breakout harness, each of the first breakout harness and the second breakout harness including an equipment-side connector, a first trunk-side connector, and a second trunk-side connector, the equipment-side connector having a first row of optical fiber channels and a second row of optical fiber channels, the first row of optical fiber channels being connected to the first trunk-side connector via a first plurality of optical fibers such that a left-to-right order of the first plurality of optical fibers in the first row of optical fiber channels relative to a key positioned on the equipment-side connector is the same as a left-to-right order of the first plurality of optical fibers in the first trunk-side connector relative to a key positioned on the first trunk-side connector, and the second row of optical fiber channels being connected to the second trunk-side connector via a second plurality of optical fibers such that a left-to-right order of the second plurality of optical fibers in the second row of optical fiber channels relative to the key positioned on the equipment-side connector is the same as a left-to-right order of the second plurality of optical fibers in the second trunk-side connector relative to a key positioned on the second trunk-side connector. The communication link also includes a first trunk cable and a second trunk cable, each of the first trunk cable and the second trunk cable including a first trunk-cable connector and a second trunk-cable connector, the first trunk-cable connector being connected to the second trunk-cable connector via a third plurality of optical fibers such that a left-to-right order of the third plurality of optical fibers in the first trunk-cable connector relative to a key positioned on the first trunk-cable connector is the same as a left-to-right order of the third plurality of optical fibers in the second trunk-cable connector relative to a key positioned on the second trunk-cable connector, the first trunk cable connecting the first trunk-side connector of the first breakout harness to the second trunk-side connector of the second breakout harness, and the second trunk cable connecting the second trunk-side connector of the first breakout harness to the first trunk-side connector of the second breakout harness.

In a variation of the above-described embodiments, the communication links described therein can be employed in a fiber optic telecommunication system for connecting together multiple pieces of telecommunication equipment such as, for example, patch panels and/or transceivers, while maintaining appropriate polarity.

These and other features, aspects, and advantages of the present invention will become better understood with reference to the following drawings, description, and any claims that may follow.

DETAILED DESCRIPTION

Figure 1:
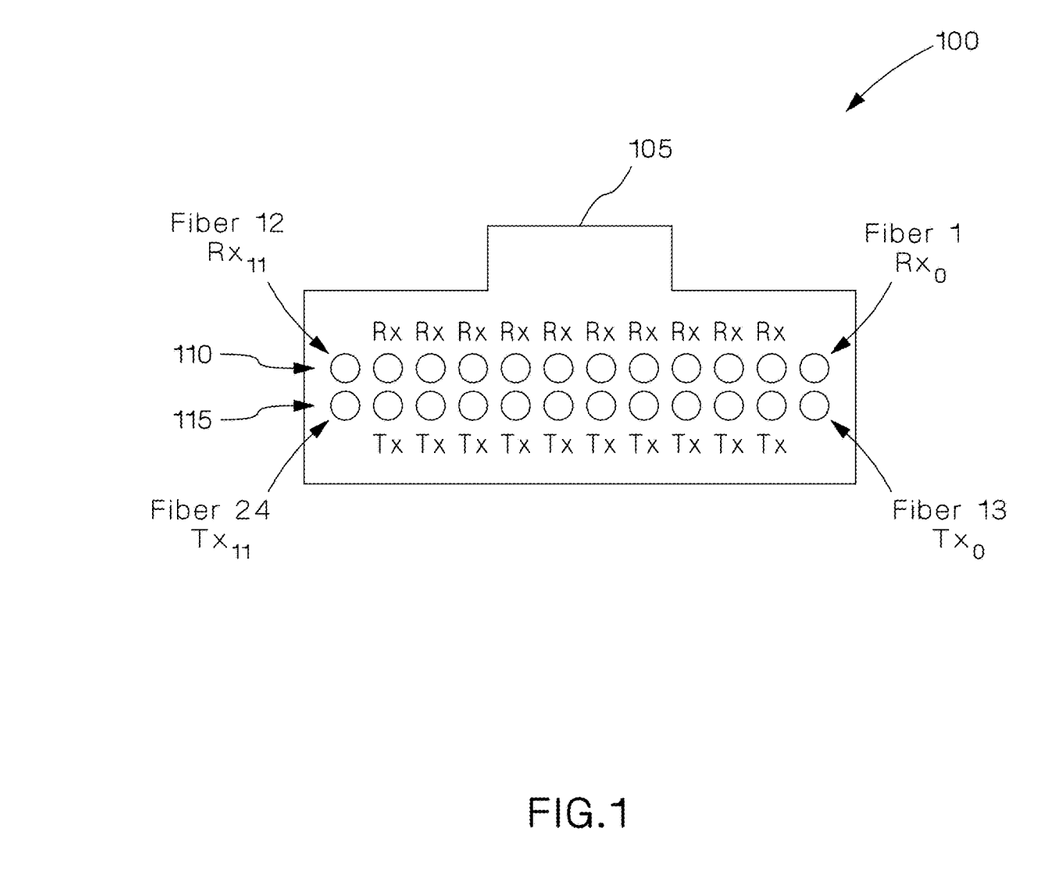
FIG. 1 illustrates a front view of a 24-fiber transceiver receptacle.

The system and methods according to embodiments of the present invention may be used to connect 24-fiber transceivers such as 100GBASE-SR10 transceivers. A general view of the transmit (Tx) and receiver (Rx) lanes of a 100GBASE-SR10 transceiver is shown in FIG. 1. In particular, the transceiver 100 includes a total of 24 fiber lanes aligned in two rows of 12 lanes. Reference to the top and/or bottom rows are expressed with respect to the key 105 positioned at the top of the connector. The top row 110 includes 12 lanes of which only the center 10 are used to receive optical signals. The bottom row 115 also includes 12 lanes and likewise uses only the center 10 lanes to transmit optical signals. Note that while the outside lanes are labeled as $Rx_0$, $Rx_{11}$, $Tx_0$, and $Tx_{11}$, these markings are merely for demarcation purposes and are provided to illustrate/denote the physical positioning of the channels.

Pursuant to IEEE 802.3 clause 86.6, the text of which is incorporated herein by reference in its entirety, there are no lane assignments for 100GBASE-SR10 transceivers, and instead, the transceiver hardware is expected to be able to map the appropriate electrical lanes to the appropriate optical lanes.

Figure 2:
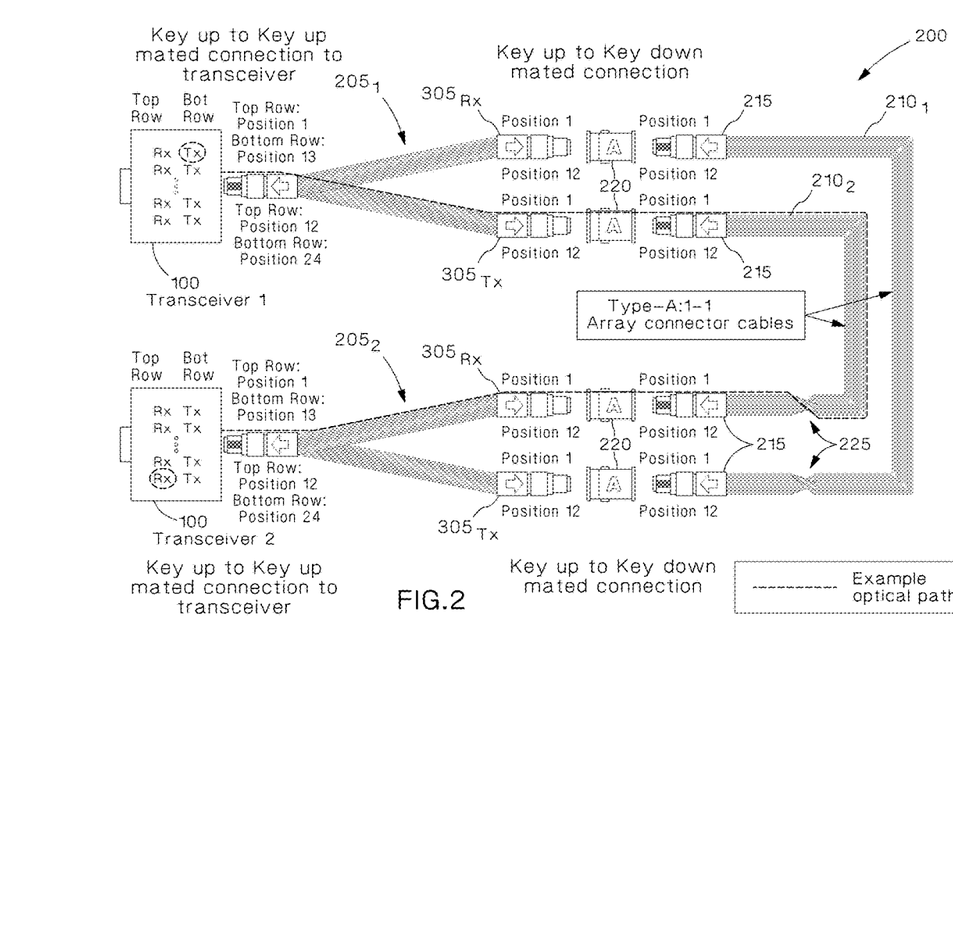
FIG. 2 illustrates an interconnection system according to an embodiment of the present invention.
Figure 3A:
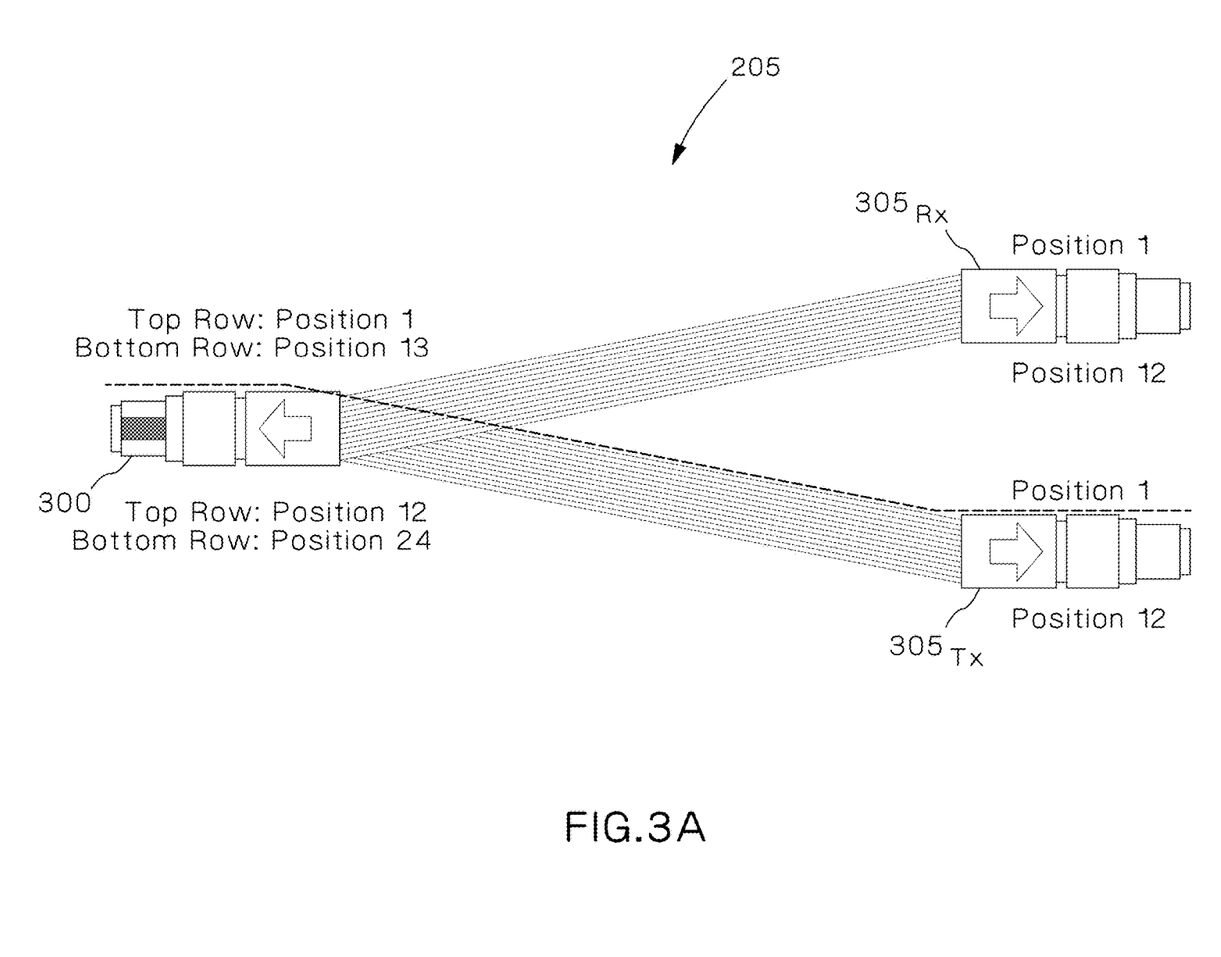
FIG. 3A illustrates a harness used in the interconnection system of FIG. 2.
Figure 3B:
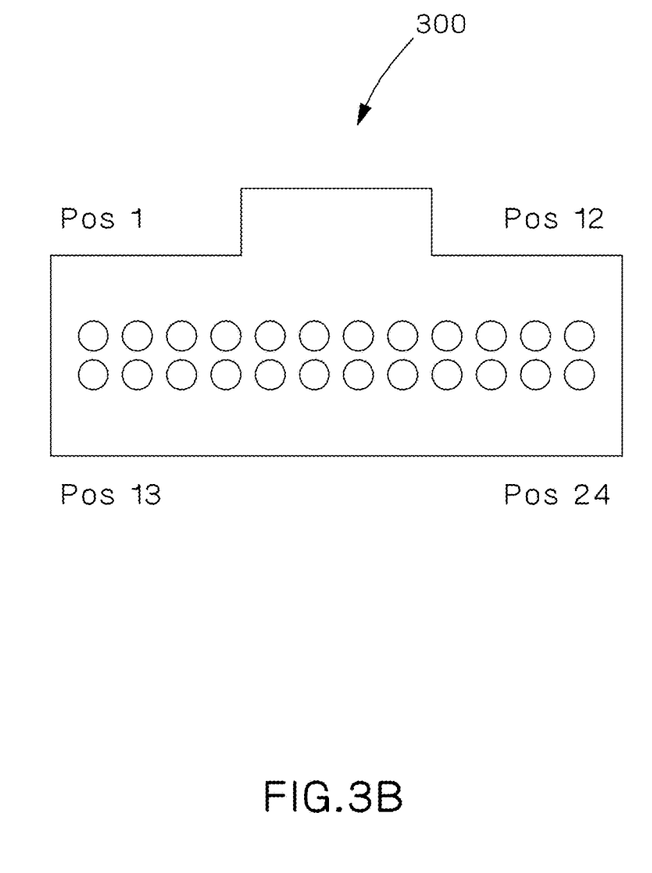
FIG. 3B illustrates a front view of a 24-fiber connector used on one end of the harness of FIG. 3A.
Figure 3C:
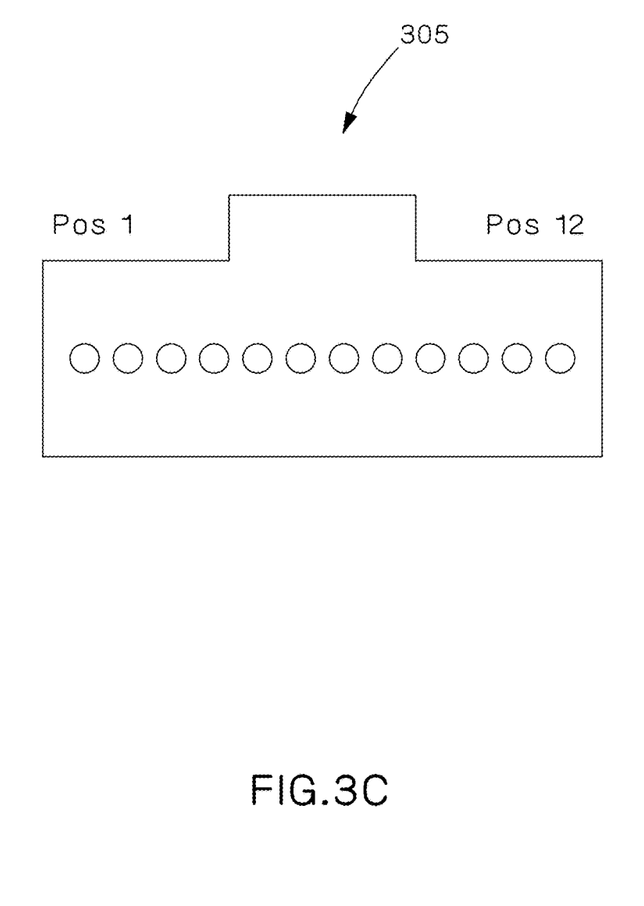
FIG. 3C illustrates a front view of a 12-fiber connector used on another end of the harness of FIG. 3A.

FIG. 2 illustrates an interconnection system 200 for connecting two transceivers 100. For each transceiver 100, the interconnection system 200 includes a breakout harness 205. As shown in more detail in FIG. 3A, the breakout harness 205 includes a 24-fiber connector 300 (e.g., MPO or MPO-style connector) on one end and two 12-fiber connectors 305 (e.g., MPO or MPO-style connectors) on the other end. The 24-fiber connector 300 is designed to mate with the 24-fiber transceiver 100, and thus includes two rows of 12 fibers, as shown in FIG. 3B. The top 12 fibers are routed to the first 12-fiber connector $305_{Rx}$ and the bottom 12 fibers are routed to the second 12-fiber connector $305_{Tx}$. The two 12-fiber connectors 305 are designed to mate with backbone/trunk cables, such as, for example, 12-fiber ribbon trunk cables. As shown in FIG. 3C, both 12-fiber connectors have all 12 fibers positioned in a single row. Such configurations are commonly used with 12-fiber MPO or MPO-style connectors.

Figure 4:
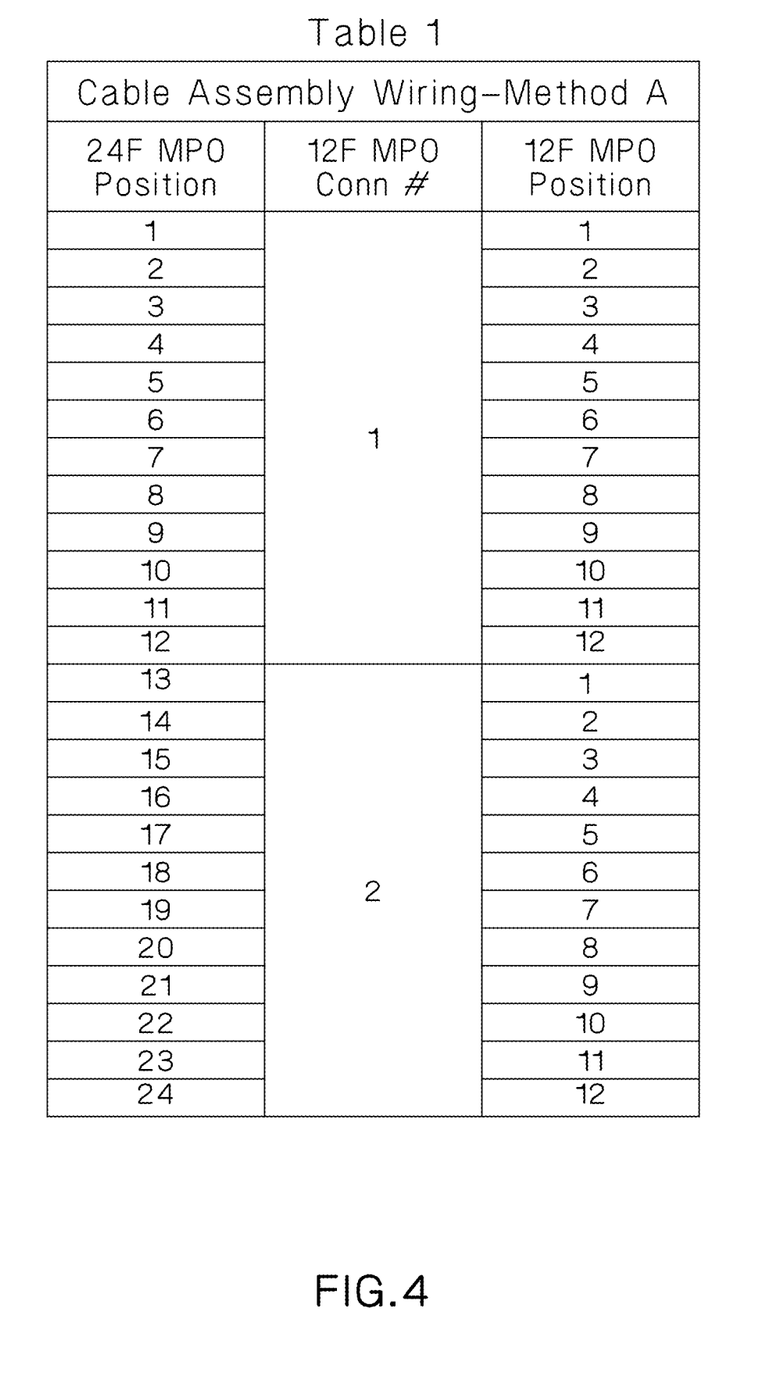
FIG. 4 illustrates the fiber routing scheme for the harness of FIG. 3A.

The fibers routed between connector 300 and connectors 305 may be ribbonized or they may be kept as lose fibers. Furthermore, the fibers are routed such that the fibers occupying positions 1-12 in connector 300 are routed to positions 1-12 in connector $305_{Rx}$, respectively, and fibers occupying positions 13-24 in connector 300 are routed to positions 1-12 in connector $305_{Tx}$, respectively. Note that the position of a fiber within a connector is expressed with reference to the connector key being positioned on the top and the numbering going from left to right starting at the top-most row. This routing scheme is detailed in Table 1 shown in FIG. 4.

Referring back to FIG. 2, the interconnection system 200 further includes two trunk cables/links 210 which link the trunk ends of the breakout harnesses 205. Each trunk cable 210 includes a 12-fiber MPO or MPO-style array connector 215 at each end thereof and acts as a 1-1 cable (may also be known as a Type-A: 1-1 connector cable in the relevant art). Accordingly, optical fibers in positions 1-12 at one end of the cable are routed to positions 1-12, respectively, at the other end of the cable. Note, that while only one cable is illustrated between each pair of connectors 305, this is merely exemplary, and other configurations which include more than one cable are within the scope of the present invention. To enable the trunk cable connectors 215 and the trunk end harness connectors 305 to mate appropriately, adapters 220 are used. The adapters 220 are key-up to key-down adapters which allow any of the mated connector pairs to align respective fiber positions (i.e., fiber positions 1-12 in a connector 305 respectively line up with fiber positions 1-12 in a mated connector 215).

To permit appropriate Tx-to-Rx routing between transceivers, connector $305_{Rx}$ of the first breakout harness $205_1$ is connected via the trunk cable $210_1$ with the connector $305_{Tx}$ of the second breakout harness $205_2$, and connector $305_{Rx}$ of the second breakout harness $205_2$ is connected via the trunk cable $210_2$ with the connector $305_{Tx}$ of the first breakout harness $205_1$. Furthermore, in order to maintain appropriate connector key orientation, each of the trunk cables 210 must include 1 (or an odd number of) twist(s) 225.

Figure 5:
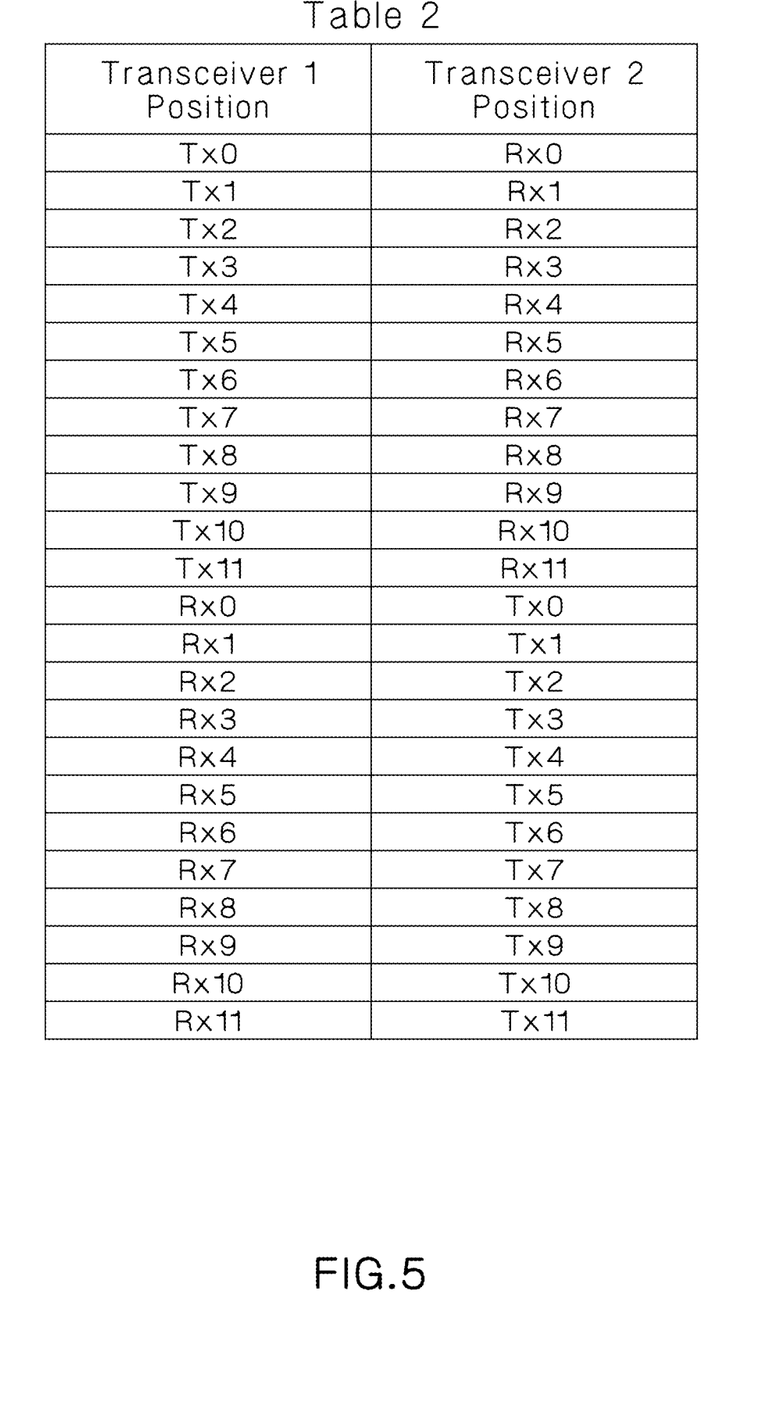
FIG. 5 illustrates the lane routing from the first transceiver to the second transceiver shown in the system of FIG. 2.

The resulting transceiver-to-transceiver lane transition of the system 200 is shown in Table 2 of FIG. 5. As can be seen in Table 2, each Tx lane of transceiver 1 is paired up with an Rx lane of transceiver 2. Likewise, each Tx lane of transceiver 2 is paired up with an Rx lane of transceiver 1.

The system of the above-described embodiment and a method corresponding to the implementation of the system may be beneficial for a number of reasons. For example, the system 200 permits the use of a key-up to key-down connection scheme between the harnesses 205 and the trunk cables/links 210. This scheme may improve signal transmission quality as it may allow the use of angled ferrules for connectors 305 and 215. Furthermore, the system 200 permits the use of the same harness 205 for both ends of the interconnection link. This may help reduce errors during interconnection implementation where an installer may not be aware of the type of a harness installed on one end of the link.

While this invention has been described in terms of several embodiments, these embodiments are non-limiting (regardless of whether they have been labeled as exemplary or not), and there are alterations, permutations, and equivalents, which fall within the scope of this invention. Additionally, the described embodiments should not be interpreted as mutually exclusive, and should instead be understood as potentially combinable if such combinations are permissive. Moreover, any methods described or claimed, or that may be claimed should not be limited to any specific sequence of steps, and instead should be understood to encompass any sequence if such a sequence is allowable. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

I claim:

1. A communication link for use in a fiber optic communication network, said communication link comprising:
   a first breakout harness and a second breakout harness, each of said first breakout harness and said second breakout harness comprising:
      an equipment-side connector including a key, and a first and a second row of optical fiber channels positioned relative to said equipment-side connector key;
      a first trunk-side connector including a key and a row of optical fiber channels positioned relative to said first trunk-side connector key;
      a second trunk-side connector including a key and a row of optical fiber channels positioned relative to said second trunk-side connector key;
      a first plurality of optical fibers connecting said first row of optical fiber channels of said equipment-side connector to said row of optical fiber channels of said first trunk-side connector such that a left-to-right order of each of said first plurality of optical fibers is the same in both of said equipment-side connector and said first trunk-side connector when determined relative to respective said keys; and
      a second plurality of optical fibers connecting said second row of optical fiber channels of said equipment-side connector to said row of optical fiber channels of said second trunk-side connector such that a left-to-right order of each of said second plurality of optical fibers is the same in both of said equipment-side connector and said second trunk-side connector when determined relative to respective said keys; and
   a first trunk cable and a second trunk cable, each of said first trunk cable and said second trunk cable comprising:
      a first trunk-cable connector including a key and a row of optical fiber channels positioned relative to said first trunk-cable connector key;
      a second trunk-cable connector including a key and a row of optical fiber channels positioned relative to said second trunk-cable connector key; and
      a third plurality of optical fibers connecting said row of optical fiber channels of said first trunk-cable connector to said row of optical fiber channels of said second trunk-cable connector such that a left-to-right order of each of said third plurality of optical fibers is the same in both of said first trunk-cable connector and said second trunk-cable connector when determined relative to respective said keys,
   wherein said first trunk-side connector of said first breakout harness is connected to said second trunk-side connector of said second breakout harness at least partially via said first trunk cable, and wherein said second trunk-side connector of said first breakout harness is connected to said first trunk-side connector of said second breakout harness at least partially via said second trunk-cable.

2. The communication link of claim 1, wherein said first trunk-side connector of said first breakout harness is connected to said first trunk-cable connector of said first trunk cable in a key-up to key-down configuration, and wherein said second trunk-side connector of said second breakout harness is connected to said second trunk-cable connector of said first trunk cable in a key-up to key-down configuration.

3. The communication link of claim 2, wherein said second trunk-side connector of said first breakout harness is connected to said first trunk-cable connector of said second trunk cable in a key-up to key-down configuration, and wherein said first trunk-side connector of said second breakout harness is connected to said second trunk-cable connector of said second trunk cable in a key-up to key-down configuration.

4. The communication link of claim 1, wherein said first row of optical fiber channels in said equipment-side connector includes twelve optical fiber channels, and wherein said second row of optical fiber channels in said equipment-side connector includes twelve optical fiber channels.

5. The communication link of claim 4, wherein said equipment-side connector is a 24-fiber MPO connector.

6. The communication link of claim 4, wherein said row of optical fiber channels in said first trunk-side connector includes twelve optical fiber channels, and wherein said row of optical fiber channels in said second trunk-side connector includes twelve optical fiber channels.

7. The communication link of claim 6, wherein said row of optical fiber channels in said first trunk-cable connector includes twelve optical fiber channels, and wherein said row of optical fiber channels in second trunk-cable connector includes twelve optical fiber channels.

8. The communication link of claim 1, wherein at least one of said first plurality of optical fibers, said second plurality of optical fibers, and third plurality of optical fibers includes twelve optical fibers.

9. The communication link of claim 1, wherein said first trunk-side connector of said first breakout harness is connected to said first trunk-cable connector of said first trunk cable via a first key-up to key-down adapter, and wherein said second trunk-side connector of said second breakout harness is connected to said second trunk-cable connector of said first trunk cable via a second key-up to key-down adapter.

10. The communication link of claim 9, wherein said second trunk-side connector of said first breakout harness is connected to said first trunk-cable connector of said second trunk cable via a third key-up to key-down adapter, and wherein said first trunk-side connector of said second breakout harness is connected to said second trunk-cable connector of said second trunk cable via a fourth key-up to key-down adapter.

11. The communication link of claim 1, wherein at least one of said equipment-side connector, said first trunk-side connector, said second trunk-side connector, said first trunk-cable connector, and said second trunk-cable connector includes a ferrule having an angled mating face.

12. A fiber optic telecommunication system comprising:
a first telecommunication equipment;
a second telecommunication equipment; and
a communication link comprising:
a first breakout harness and a second breakout harness, each of said first breakout harness and said second breakout harness comprising:
an equipment-side connector including a key, and a first and a second row of optical fiber channels positioned relative to said equipment-side connector key;
a first trunk-side connector including a key and a row of optical fiber channels positioned relative to said first trunk-side connector key;
a second trunk-side connector including a key and a row of optical fiber channels positioned relative to said second trunk-side connector key;
a first plurality of optical fibers connecting said first row of optical fiber channels of said equipment-side connector to said row of optical fiber channels of said first trunk-side connector such that a left-to-right order of each of said first plurality of optical fibers is the same in both of said equipment-side connector and said first trunk-side connector when determined relative to respective said keys; and
a second plurality of optical fibers connecting said second row of optical fiber channels of said equipment-side connector to said row of optical fiber channels of said second trunk-side connector such that a left-to-right order of each of said second plurality of optical fibers is the same in both of said equipment-side connector and said first trunk-side connector when determined relative to respective said keys; and
a first trunk cable and a second trunk cable, each of said first trunk cable and said second trunk cable comprising:
a first trunk-cable connector including a key and a row of optical fiber channels positioned relative to said first trunk-cable connector key;
a second trunk-cable connector including a key and a row of optical fiber channels positioned relative to said second trunk-cable connector key; and a
a third plurality of optical fibers connecting said row of optical fiber channels of said first trunk-cable connector to said row of optical fiber channels of said second trunk-cable connector such that a left-to-right order of each of said third plurality of optical fibers is the same in both of said first trunk-cable connector and said second trunk-cable connector when determined relative to respective said keys,
wherein said first trunk-side connector of said first breakout harness is connected to said second trunk-side connector of said second breakout harness at least partially via said first trunk cable, wherein said second trunk-side connector of said first breakout harness is connected to said first trunk-side connector of said second breakout harness at least partially via said second trunk-cable, wherein said equipment-side connector of said first breakout harness is connected to said first telecommunication equipment, and wherein said equipment-side connector of said second breakout harness is connected to said second telecommunication equipment.

13. The system of claim 12, wherein at least one of said first telecommunication equipment and said second telecommunication equipment includes a patch panel.

14. The system of claim 12, wherein at least one of said first telecommunication equipment and said second telecommunication equipment includes a fiber optic transceiver, said fiber optic transceiver being connected to at least one of said equipment-side connector of said first breakout harness and said equipment-side connector of said second breakout harness.

15. The system of claim 14, wherein said fiber optic transceiver is a 100GBASE-SR10 transceiver.

16. The system of claim 14, wherein said fiber optic transceiver is connected to said at least one of said equipment-side connector of said first breakout harness and said equipment-side connector of said second breakout harness via a multi-fiber receptacle, said multi-fiber receptacle including a row of transmitter elements and a row of receiver elements.

17. A communication link for use in a fiber optic communication network, said communication link comprising:
a first breakout harness and a second breakout harness, each of said first breakout harness and said second breakout harness including an equipment-side connector, a first trunk-side connector, and a second trunk-side connector, said equipment-side connector having a first row of optical fiber channels and a second row of optical fiber channels,
said first row of optical fiber channels being connected to said first trunk-side connector via a first plurality of optical fibers such that a left-to-right order of said first plurality of optical fibers in said first row of optical fiber channels relative to a key positioned on said equipment-side connector is the same as a left-to-right order of said first plurality of optical fibers in said first trunk-side connector relative to a key positioned on said first trunk-side connector, and
said second row of optical fiber channels being connected to said second trunk-side connector via a second plurality of optical fibers such that a left-to-right order of said second plurality of optical fibers in said second row of optical fiber channels relative to said key positioned on said equipment-side connector is the same as a left-to-right order of said second plurality of optical fibers in said second trunk-side connector relative to a key positioned on said second trunk-side connector; and a first trunk cable and a second trunk cable, each of said first trunk cable and said second trunk cable including a first trunk-cable connector and a second trunk-cable connector, said first trunk-cable connector being connected to said second trunk-cable connector via a third plurality of optical fibers such that a left-to-right order of said third plurality of optical fibers in said first trunk-cable connector relative to a key positioned on said first trunk-cable connector is the same as a left-to-right order of said third plurality of optical fibers in said second trunk-cable connector relative to a key positioned on said second trunk-cable connector, said first trunk cable connecting said first trunk-side connector of said first breakout harness to said second trunk-side connector of said second breakout harness, and said second trunk cable connecting said second trunk-side connector of said first breakout harness to said first trunk-side connector of said second breakout harness.

18. The communication link of claim 17, wherein said first trunk-side connector of said first breakout harness is connected to said first trunk-cable connector of said first trunk cable in a key-up to key-down configuration, and wherein said second trunk-side connector of said second breakout harness is connected to said second trunk-cable connector of said first trunk cable in a key-up to key-down configuration.

19. The communication link of claim 18, wherein said second trunk-side connector of said first breakout harness is connected to said first trunk-cable connector of said second trunk cable in a key-up to key-down configuration, and wherein said first trunk-side connector of said second breakout harness is connected to said second trunk-cable connector of said second trunk cable in a key-up to key-down configuration.

20. The communication link of claim 17, wherein said first row of optical fiber channels includes twelve optical fiber channels, and wherein said second row of optical fiber channels includes twelve optical fiber channels.

21. The communication link of claim 20, wherein said equipment-side connector is a 24-fiber MPO connector.

22. The communication link of claim 17, wherein at least one of said first plurality of optical fibers, said second plurality of optical fibers, and third plurality of optical fibers includes twelve fibers.

* * * * *